(12) United States Patent
Picek et al.

(10) Patent No.: US 8,286,572 B1
(45) Date of Patent: Oct. 16, 2012

(54) FISHING ROD HOLDING SYSTEM

(76) Inventors: James Picek, Mitchell, SD (US); Linda Picek, Mitchell, SD (US)

( * ) Notice: Subject to any disclaimer, the term of this patent is extended or adjusted under 35 U.S.C. 154(b) by 267 days.

(21) Appl. No.: 12/874,047

(22) Filed: Sep. 1, 2010

(51) Int. Cl.
*F16M 13/00* (2006.01)

(52) U.S. Cl. .......................... 114/343; 114/218; 114/364

(58) Field of Classification Search .................. 114/218, 114/343, 364; 43/21.2, 54.1; D22/147
See application file for complete search history.

(56) References Cited

U.S. PATENT DOCUMENTS

| | | | |
|---|---|---|---|
| 4,202,125 A * | 5/1980 | Kovacs | ............................. 43/17 |
| 5,247,759 A | 9/1993 | Noriega | |
| 5,312,077 A | 5/1994 | Gutierrez | |
| 5,519,959 A | 5/1996 | Cross | |
| 5,662,306 A * | 9/1997 | Dysarz | ........................... 248/514 |
| 7,172,164 B2 | 2/2007 | Fuelling et al. | |
| 7,232,099 B1 | 6/2007 | Wilcox | |
| 7,520,233 B1 | 4/2009 | Lyon | |
| 2005/0246939 A1 * | 11/2005 | Keck | ................................. 43/17 |
| 2008/0155882 A1 | 7/2008 | Wegman | |
| 2010/0000144 A1 | 1/2010 | Yang | |

* cited by examiner

*Primary Examiner* — Edwin Swinehart

(57) ABSTRACT

A fishing rod holding system includes a plate having a bend therein to define a first section and a second section. The first section has a plurality of mounting apertures therein and is positionable between a tie cleat and a boat hull. A plurality of fasteners is extendable through the cleat and the apertures and into the boat hull to retain the first section on the boat hull so that the second section is positioned below the first section and extends outwardly from the boat hull into an interior area of the boat hull. The second section has a holder aperture extending therethrough. The holder aperture is configured to removably receive a rod holder. The second section has a plurality of attachment apertures extending therethrough. A plurality of securing members is extended through the rod holder and the attachment apertures to releasably secure the rod holder to the second section.

7 Claims, 4 Drawing Sheets

FISHING ROD HOLDING SYSTEM

BACKGROUND OF THE DISCLOSURE

Field of the Disclosure

The disclosure relates to boat mountable fishing rod holder devices and more particularly pertains to a new boat mountable fishing rod holder device for allowing a person to mount a rod holder to a boat hull without having to add additional holes to the boat hull.

SUMMARY OF THE DISCLOSURE

An embodiment of the disclosure meets the needs presented above by generally comprising a plate that has a top side, a bottom side and a perimeter edge. The perimeter edge includes a first edge, a second edge, a third edge and a fourth edge wherein the first and second edges are positioned opposite of each other. The plate is rigid. The top side of the plate has a bend therein extending between the third and fourth edges to define a first section between the first edge and the bend and a second section between the second edge and the bend. The first section has a plurality of mounting apertures therein. The first section is positionable between a tie cleat and a boat hull. A plurality of fasteners is extendable through the cleat and the apertures and into the boat hull to retain the first section on the boat hull so that the second section is positioned below the first section and extends outwardly from the boat hull into an interior area of the boat hull. The second section has a holder aperture extending therethrough. The holder aperture is configured to removably receive a rod holder. The second section has a plurality of attachment apertures extending therethrough. A plurality of securing members is extended through the rod holder and the attachment apertures to releasably secure the rod holder to the second section.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
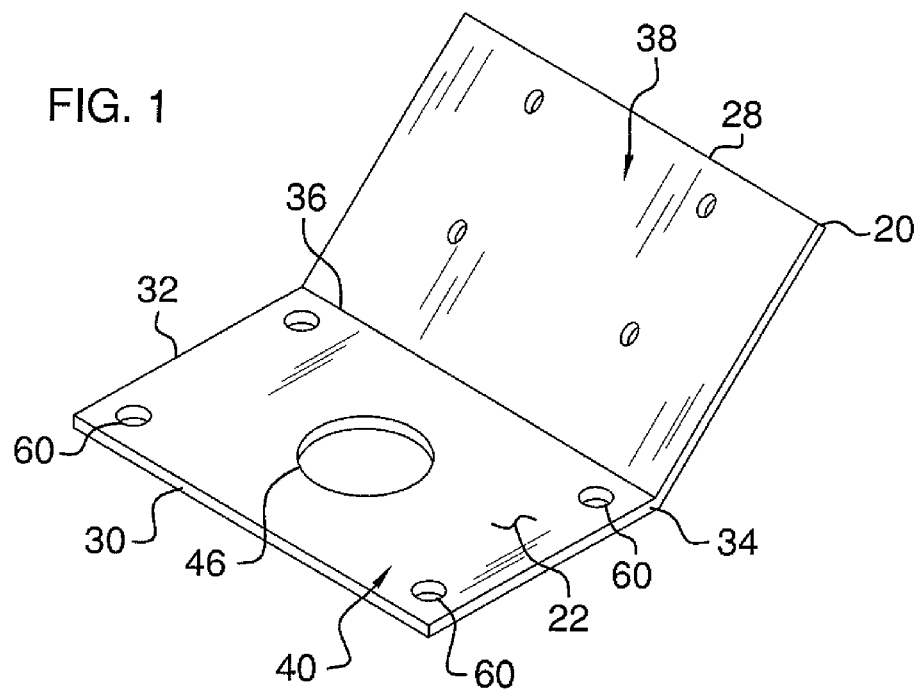
FIG. 1 is a top perspective view of a plate of a fishing rod holding system according to an embodiment of the disclosure.
Figure 2:
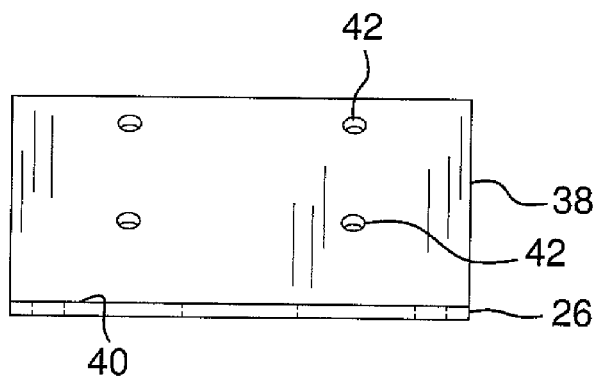
FIG. 2 is a front view of an embodiment of the disclosure.
Figure 3:
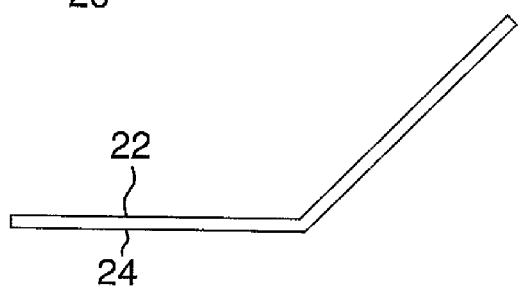
FIG. 3 is a side view of an embodiment of the disclosure.
Figure 4:
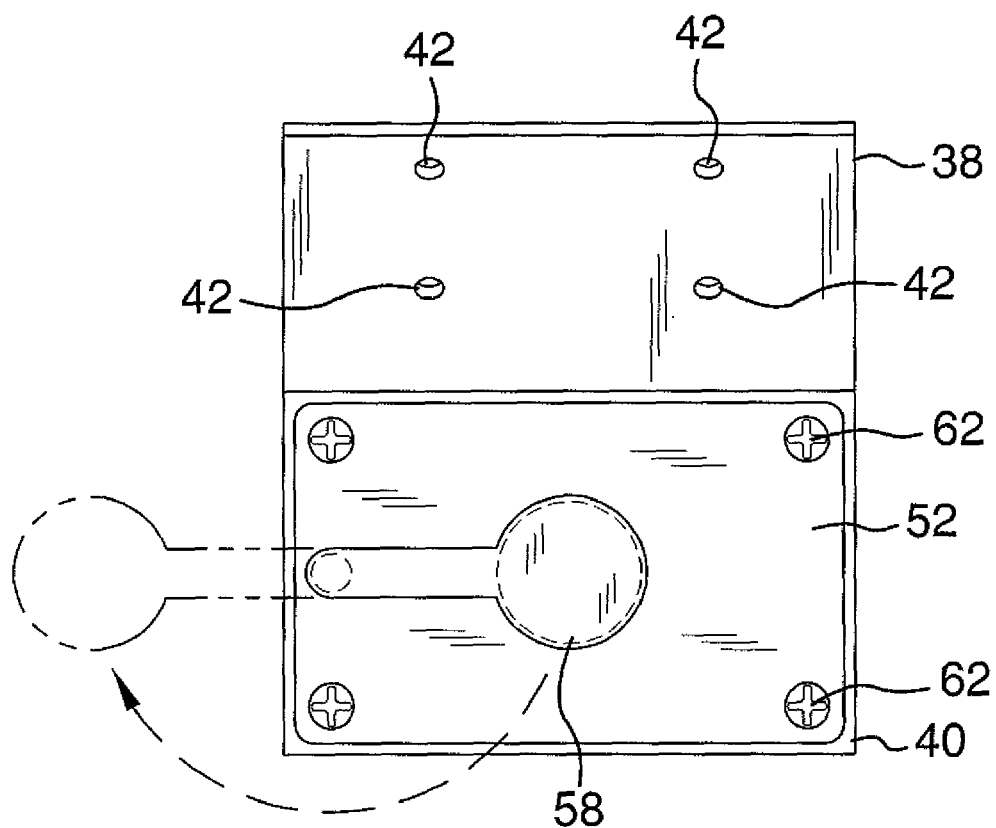
FIG. 4 is a top view of an embodiment of the disclosure.

With reference now to the drawings, and in particular to FIGS. 1 through 6 thereof, a new boat mountable fishing rod holder device embodying the principles and concepts of an embodiment of the disclosure and generally designated by the reference numeral 10 will be described.

As best illustrated in FIGS. 1 through 6, the fishing rod holding system 10 generally comprises a boat hull 12 that has an inner surface 14. A conventional a tie down cleat 16, used for securing ropes to the boat hull 12, is removably coupled to the inner surface 14.

A plate 20 has a top side 22, a bottom side 24 and a perimeter edge 26, the perimeter edge 26 includes a first edge 28, a second edge 30, a third edge 32 and a fourth edge 34 wherein the first 28 and second 30 edges are positioned opposite of each other. The plate 20 is rigid and may be comprised of a metallic material. The plate 20 may have width along the first edge 28 between about 4 inches and 5 inches and a length between about 5 inches and 7 inches. The plate 20 has a bend 36 therein extending between the third 32 and fourth 4 edges to define a first section 38 between the first edge 28 and the bend 36 and a second section 40 between the second edge 30 and the bend 36. The bend 36 forms an angle in the top side 22 between 110° and 150° and may be equal to approximately 120°.

The first section 38 has a plurality of mounting apertures 42 therein. The first section 38 is positioned between the cleat 16 and the boat hull 12. In particular, the mounting apertures 42 will be positioned so that they are aligned with openings in the hull 12 that are also used by the cleat 16. A plurality of fasteners 44, such as screws, extends through the cleat 16 and the apertures 42 and into the boat hull 12 to retain the first section 38 on the boat hull 12. The second section 40 is positioned below the first section 38 and extends outwardly from the boat hull 12 into an interior area of the boat hull 12.

Figure 5:
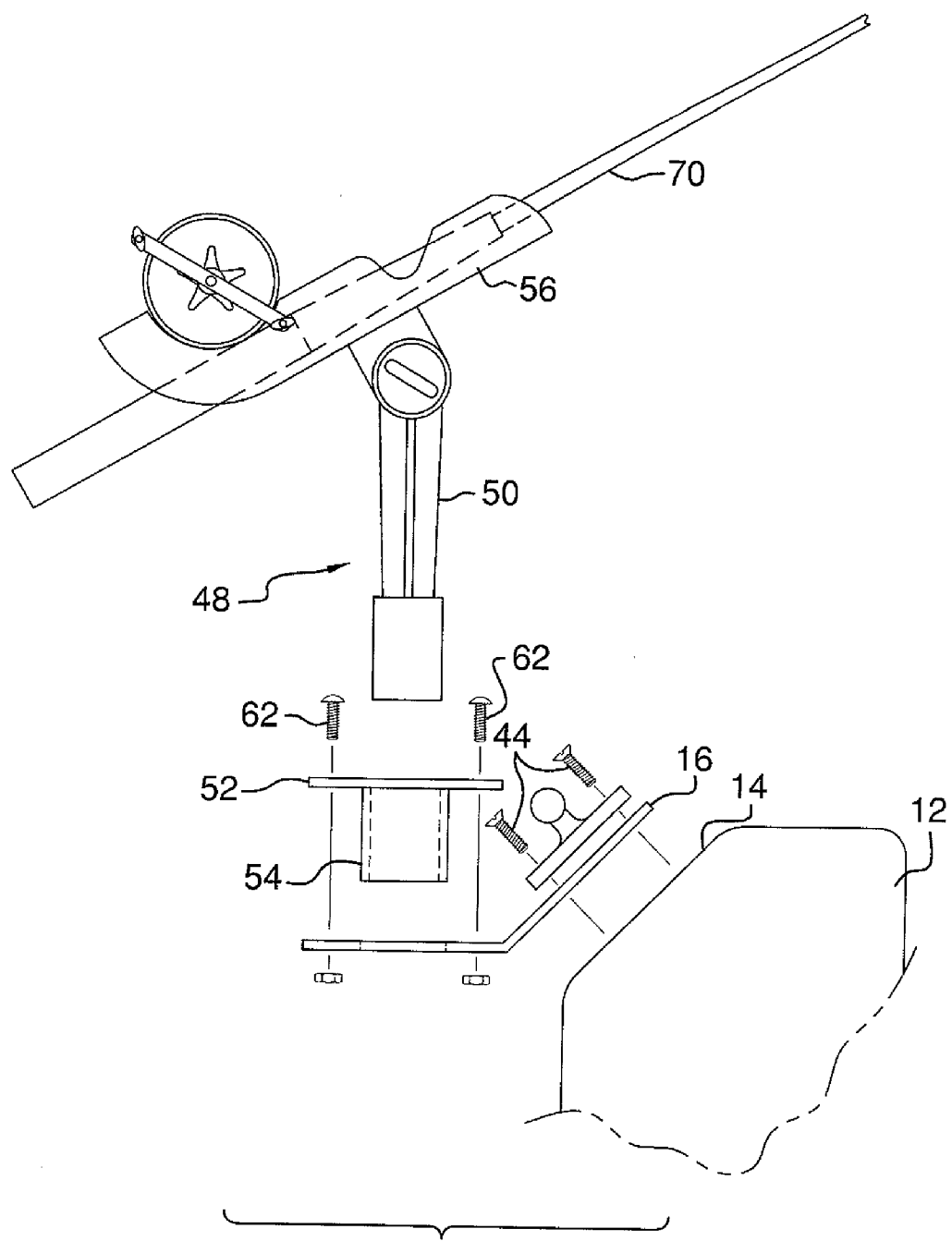
FIG. 5 is an exploded side view of an embodiment of the disclosure.

The second section 40 has a holder aperture 46 extending therethrough. The holder aperture 46 is generally centrally located and has a diameter equal to about 1¼ inches. A rod holder 48 is removably positioned in the holder aperture 46. As shown in FIG. 5, this will allow the rod holder 48 to extend upwardly from the second section 40 and hold a fishing rod 70 in a correct angle. The rod holder 48 includes a post 50 removably engaged with a mounting panel 52. The mounting panel 52 includes a male coupler 54 that extends downwardly through the holder aperture 46 to retain the mounting panel 52 on the plate 20. The male coupler 54 also forms a cylinder for receiving the post 50. A saddle 56 is attached to an upper end of the post 50. The saddle 56 receives the fishing rod 70. The saddle 56 may be pivotally coupled to the post 50 to allow an angle of the saddle 56 to be adjusted to suit a person's needs. A plug 58 is removably positioned in the male coupler 54 when it is not being used.

Figure 6:
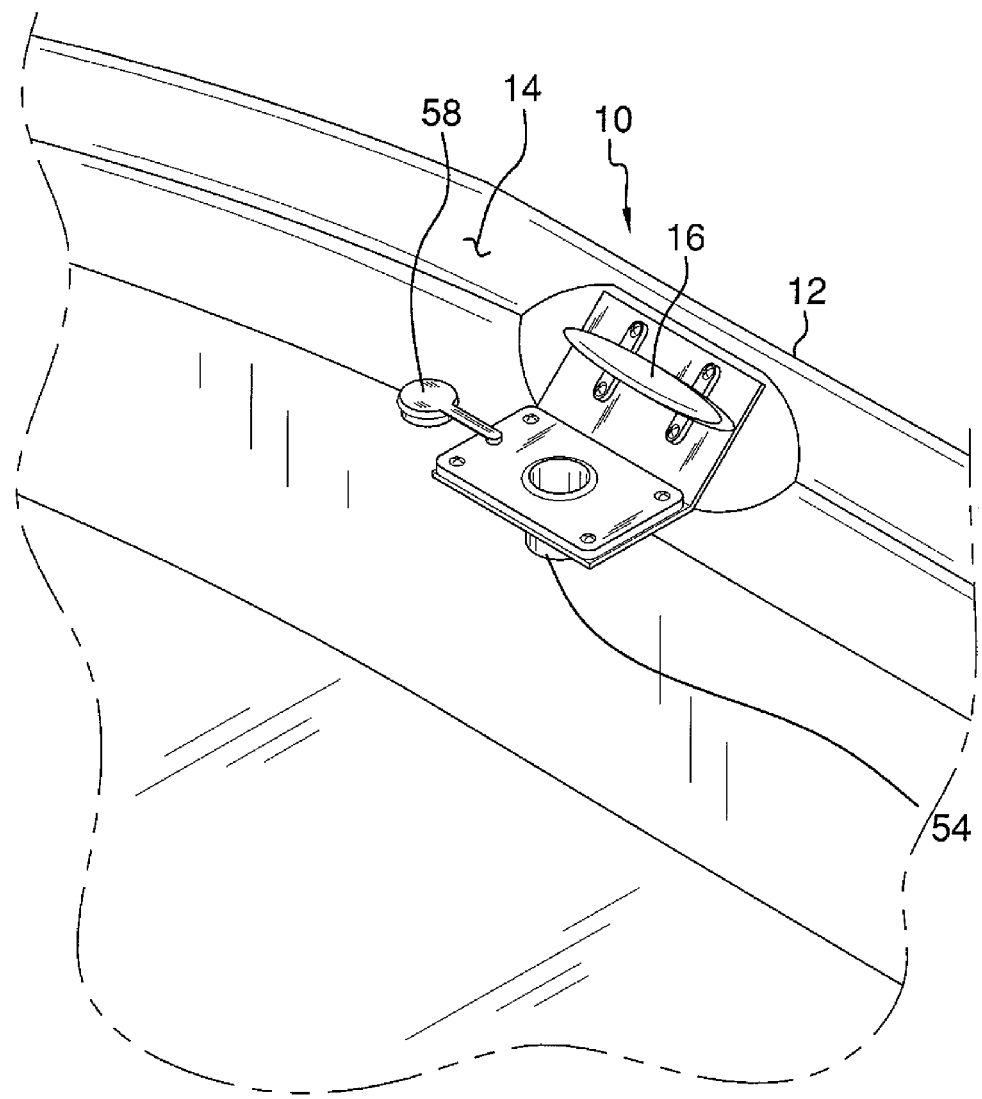
FIG. 6 is a top perspective view of an embodiment of the disclosure.

The second section 40 has a plurality of attachment apertures 60 extending therethrough. A plurality of securing members 62, such bolt and nut combinations, is extended through the rod holder 48 and the attachment apertures 60 to releasably secure the rod holder 48, and more specifically the mounting panel 52, to the second section 40 as shown in FIG. 6.

In use, the plate 20 is positioned between the cleat 16 and the hull 12 to allow the plate 20 to use the same mounting holes as were originally used by the cleat 16. This allows a person to mount a fishing rod holder to the boat hull 12 without the need of drilling additional holes in the boat hull 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A fishing pole holder receiving system comprising:

a boat hull having an inner surface, a tie down cleat being removably coupled to said inner surface;

a plate having a top side, a bottom side and a perimeter edge, said perimeter edge including a first edge, a second edge, a third edge and a fourth edge wherein said first and second edges are positioned opposite of each other, said plate being rigid, said top side of said plate having a bend therein extending between said third and fourth edges to define a first section between said first edge and said bend and a second section between said second edge and said bend;

said first section having a plurality of mounting apertures therein, said first section being positioned between said cleat and said boat hull, a plurality of fasteners extending through said cleat and said apertures and into said boat hull to retain said first section on said boat hull, said second section being positioned below said first section and extending outwardly from said boat hull into an interior area of said boat hull;

said second section having a holder aperture extending therethrough, a rod holder being removably positioned in said holder aperture.

2. The apparatus according to claim 1, wherein said bend forms an angle in said top side between 110° and 150.

3. A fishing pole holder receiving system comprising:

a boat hull having an inner surface, a tie down cleat being removably coupled to said inner surface;

a plate having a top side, a bottom side and a perimeter edge, said perimeter edge including a first edge, a second edge, a third edge and a fourth edge wherein said first and second edges are positioned opposite of each other, said plate being rigid, said plate having a bend therein extending between said third and fourth edges to define a first section between said first edge and said bend and a second section between said second edge and said bend, said bend forming an angle in said top side between 110° and 150°;

said first section having a plurality of mounting apertures therein, said first section being positioned between said cleat and said boat hull, a plurality of fasteners extending through said cleat and said apertures and into said boat hull to retain said first section on said boat hull, said second section being positioned below said first section and extending outwardly from said boat hull into an interior area of said boat hull;

said second section having a holder aperture extending therethrough, a rod holder being removably positioned in said holder aperture; and said second section having a plurality of attachment apertures extending therethrough, a plurality of securing members being extended through said rod holder and said attachment apertures to releasably secure said rod holder to said second section.

4. A fishing pole holder receiving apparatus being removably couplable to a boat hull, said apparatus comprising:

a plate having a top side, a bottom side and a perimeter edge, said perimeter edge including a first edge, a second edge, a third edge and a fourth edge wherein said first and second edges are positioned opposite of each other, said plate being rigid, said top side of said plate having a bend therein extending between said third and fourth edges to define a first section between said first edge and said bend and a second section between said second edge and said bend;

said first section having a plurality of mounting apertures therein, said first section being positionable between a cleat and the boat hull, a plurality of fasteners being extendable through said cleat and said apertures and into the boat hull to retain said first section on said boat hull so that said second section is positioned below said first section and extends outwardly from said boat hull into an interior area of the boat hull;

said second section having a holder aperture extending therethrough, said holder aperture being configured to removably receive a rod holder;

said second section having a plurality of attachment apertures extending therethrough, a plurality of securing members being extended through said rod holder and said attachment apertures to releasably secure said rod holder to said second section.

5. The apparatus according to claim 4, wherein said bend forms an angle in said top side between 110° and 150.

6. The apparatus according to claim 5, wherein said second section has a plurality of attachment apertures extending therethrough, said attachment apertures being configured to receive securing members to releasably secure said rod holder to said second section.

7. The apparatus according to claim 4, wherein said second section has a plurality of attachment apertures extending therethrough, said attachment apertures being configured to receive securing members to releasably secure said rod holder to said second section.

* * * * *